Patented Dec. 14, 1943

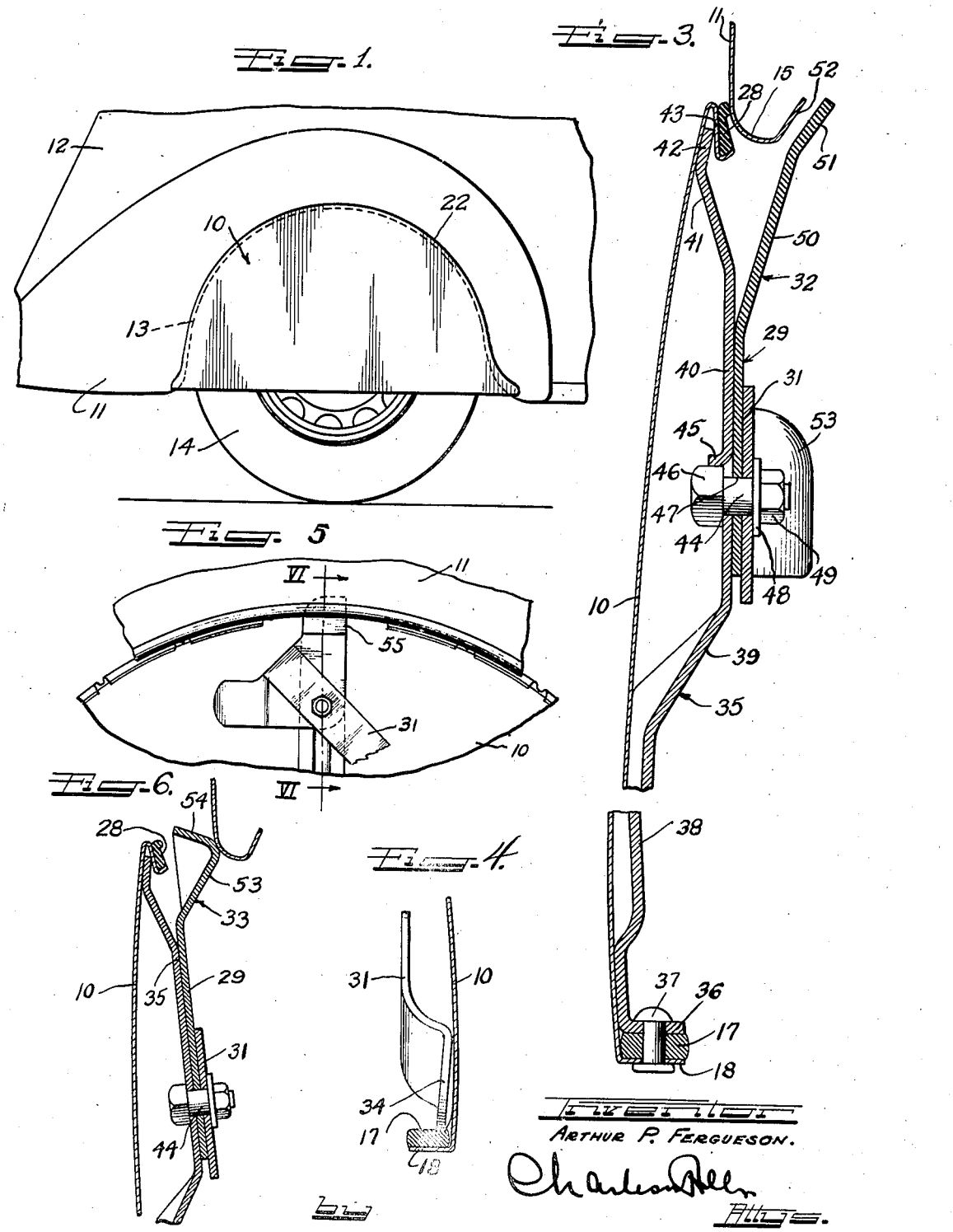

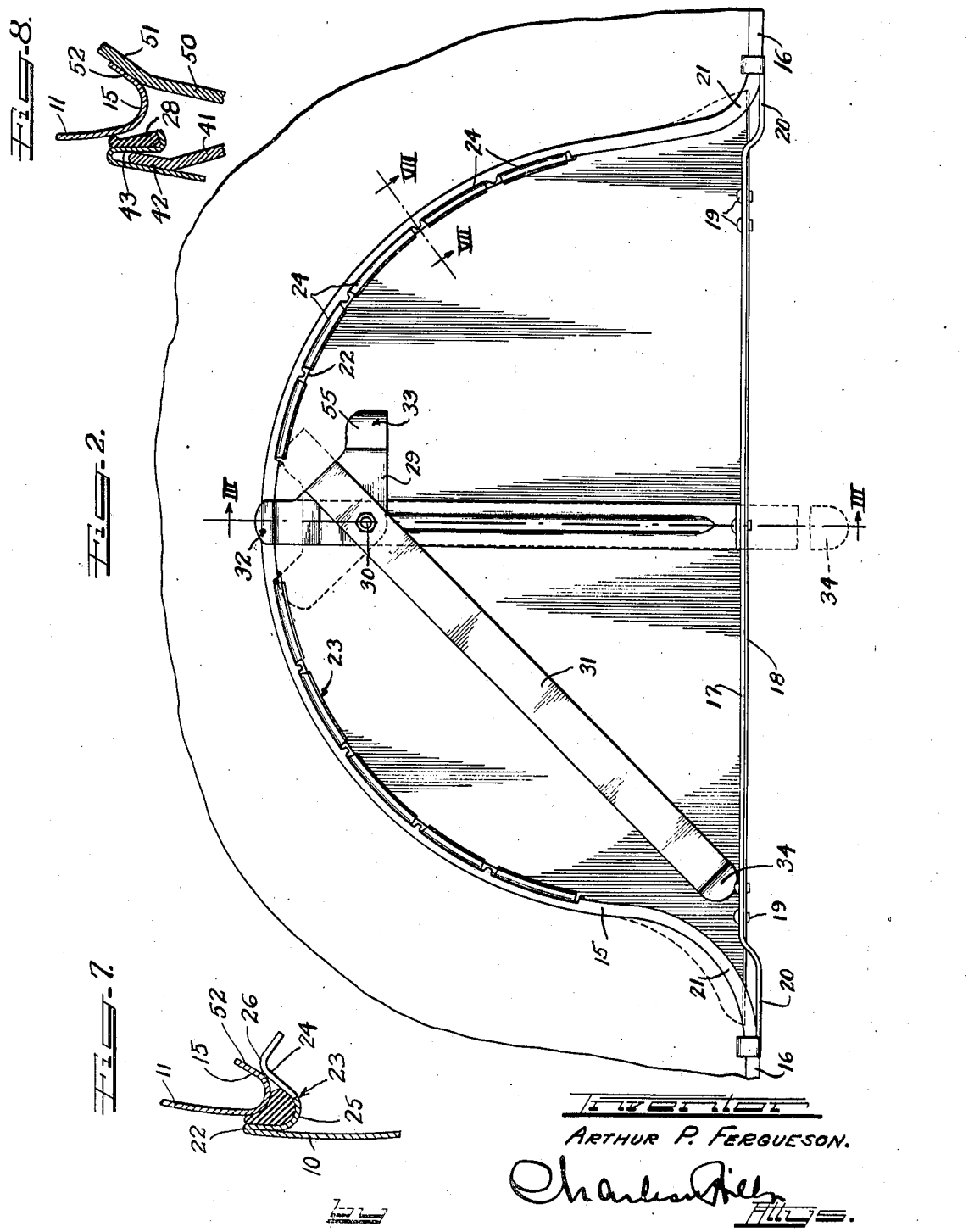

2,336,536

UNITED STATES PATENT OFFICE 2,336,536

FENDER SHIELD

Arthur P. Fergueson, Detroit, Mich., assignor to Houdaille-Hershey Corporation, Detroit, Mich., a corporation of Michigan Original application August 25, 1938, Serial No. 226,649. Divided and this application May 27, 1940, Serial No. 337,337

5 Claims. (Cl. 280—153)

This invention relates to fender shields and fender shield constructions, and more particularly to a novel fender shield with reinforcing means on the rear face thereof.

This application is a division of my copending application entitled "Concealed lever-operated fender shield latch," Serial 226,649, filed August 25, 1938, now issued as United States Letters Patent No. 2,224,428, and assigned to the same assignee as the present invention.

In designing fender shields of the type which are adapted to cover the usual wheel access opening in a vehicle fender, it is important that the means which is employed to secure the fender shield in desired position be simple and quick to operate both in the assembly of the fender shield on the vehicle fender and in removing it therefrom. The fender shield construction, as well as the latch mechanism, must possess the desired degree of ruggedness when in use to be substantially free from vibration and noise. Since the principal panel portion of fender shields is usually formed of sheet metal stock, it is also important that the shield be structurally designed to reduce possibility of damage or disforming to a minimum.

It is an object of this invention to provide a novel fender shield and fender shield latching mechanism which possesses the above highly desirable characteristics.

It is another object of this invention to provide an improved fender shield and fender shield latch which is economical to manufacture, and which is rugged and reliable in use.

It is a further object of this invention to provide a novel concealed lever-operated fender shield latch.

Another and further object of this invention is to provide a novel means for retaining the fender-engaging edge portion of a fender shield in desired position on a vehicle fender.

Another and still further object of this invention is to provide a novel combination latching and disengaging means on a fender shield.

A still further object of this invention is to provide novel means for effecting a disengagement of a fender shield from a vehicle fender after it has been mounted thereon.

A still further object of this invention is to provide a novel fender shield construction having reinforcing means on the rear face thereof.

A still further object of this invention is to provide a novel fender shield construction having an upright strut or stay extending across the rear face of the fender shield.

A still further object of this invention is to provide a novel fender shield construction having a reinforcing strut on the rear face thereof, upon which the latch mechanism is mounted and supported.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a side elevational view of the lower rear part of an automobile having the usual form of vehicle fender and equipped with a fender shield constructed in accordance with the teachings of the present invention;

Figure 2 is a rear elevational view of the fender shield and fender shield latching mechanism;

Figure 3 is a cross-sectional elevational view of the fender shield taken along the line III—III of Figure 2;

Figure 4 is a fragmentary view of the lower end of the lever-operated latch showing the manner in which it engages the lower portion of the fender shield;

Figure 5 is a fragmentary rear view of the upper portion of the fender shield in a disengaged position from the vehicle fender;

Figure 6 is a cross-sectional view taken along the line VI—VI of Figure 5;

Figure 7 is a cross-sectional view of the fender-engaging edge of the fender shield and the underturned opening defining edge of the fender taken along the line VII—VII of Figure 2; and Figure 8 is a fragmentary cross-sectional view similar to the upper portion of Figure 3 showing a modified form of my invention.

In Figure 1 of the drawings, I have illustrated a fender shield 10 constructed in accordance with the teachings of the present invention and assembled on a rear fender 11 of an automobile 12. The fender 11 is formed with the usual opening 13, which affords access to the vehicle wheel 14 and which permits ready removal of the wheel 14 in an axial direction. The fender shield 10 is disposed over the opening 13 in such a manner as to substantially close the opening and to harmonize with the outer side wall of the fender 11. The outer surface of the shield 10, may, of course, be substantially smooth, as is illustrated in the drawings, or it may assume any desired configuration for the purpose of ornamentation.

As shown in Figure 2, the outer marginal edge of the fender 11 which defines the opening 13 is underturned, as at 15, while the outer marginal edges which define the base of the fender are underturned as at 16. As is well known to those skilled in the art, fenders of the high crown type are generally provided with these underturned edge portions to increase the rigidity of the fender. As will presently be explained, advantage is taken of this feature to assemble and secure the fender shield to the vehicle fender over the opening in the latter.

In order to provide a suitable support for the ornamental fender shield 10, a bar 17 of some suitable resilient or semi-resilient material, such for example as spring steel, is secured to the underturned bottom edge 18 of the fender shield 10 in any convenient manner, such as by rivets 19, it being important only that the outer ends of the bar 17 be free to flex.

The bar 17 is so dimensioned as to extend beyond either end of the fender shield 10 to form trunnion members 20 which are adapted to be supported by the underturned edges 16 of the fender 11. The particular configuration of the trunnion members 20 may, of course, vary through wide limits without departing from the spirit and scope of the present invention, it being only necessary to shape the ends of the bar 17 so that they will extend around the underturned corners 21 of the fender 11 and then downwardly into engagement with the channels formed by the underturned edges 16. As will presently be understood, the trunnion members 20 form a convenient support for the fender shield 10, which permits the fender shield 10 to be rocked into and out of desired position on the vehicle fender 11.

While the trunnion members 20 support the fender shield 10, it will be observed that it is necessary to provide some means which will substantially hold the curved edge 22 of the shield 10 firmly against the fender 11. One form of fastening means which has been found highly desirable is to provide a rearwardly extending flange 23 on the shield 10 in proximity to the curved edge 22 having a plurality of humped resilient fingers or fastening portions 24. The intermediate portion 25 (see Figure 7) of the flange 23 is preferably shaped to assume approximately the same curvature as that of the underturned edge 15 of the fender 11, while the humped portions 26 of the fingers or portions 24 are arranged to bear against the rear face 52 of the underturned edge 15. It will thus be apparent that as the fender shield 10 is rocked into desired position about the trunnion members or supporting arms 20, the fingers 24 are cammed under the underturned edge 15 of the fender 11. As the humped portions 26 of the fingers 24 pass beneath the lowermost point of the underturned edge 15, the fingers 24 snap up against the rear surface 52 to hold the fender shield 10 in engagement with the fender 11. As will presently be explained, however, this securing engagement is augmented by a novel clamping mechanism which greatly improves the clamping and latching engagement of the fender shield on the vehicle fender and which renders the entire assembly more rugged and less apt to be accidentally disengaged from the fender 11.

A cushioning ring 28 of rubber or other suitable material may be disposed in the channel formed by the intermediate portion 25 of the flange 23 to prevent a direct metal-to-metal contact of this flange with the vehicle fender 11.

In order to augment the securing engagement provided by the fastening fingers 24, a novel concealed lever-operated fender shield latch mechanism is provided.

Turning now to the various figures of the drawings, and particularly to Figures 2 and 3, this novel latch mechanism is shown as an arrow-shape latch plate 29 which is pivotally mounted on the fender skirt as at 30, and which is operated by a concealed operating lever 31. The arrow-shape latch plate 29 includes two wing portions 32 and 33 which comprise latching and disengaging portions respectively, as will presently be described.

The concealed operating lever 31 is welded or otherwise suitably secured to the rear face of the latch plate 29 and is arranged to extend across the rear face of the fender shield 10. As may be seen best in Figure 2, the lever 31 is of such length that when the shield 10 is in its mounted position, the lower end 34 of the lever is resting on the cross bar 17 (see Figure 4); while in an intermediate position, the lower end 34 is disposed below the lower end of the fender shield 10 (see Figure 2).

The latch plate 29 is mounted on and supported by an upright bracket, strut or stay 35 which extends across the back of the fender shield 10. The lower end of the bracket 35 is turned rearwardly, as at 36 and is riveted or otherwise suitably secured to the cross bar 17 and the inturned flange 18 of the fender shield 10, such as at 37. The intermediate body portion 38 of the bracket 35 is preferably provided with a pressed-out longitudinally extending rib 38 to stiffen this portion of the bracket. The upper portion of the bracket 35 is bent rearwardly away from the rear face of the fender shield 10 as at 39, then upwardly in substantially a vertical plane, as at 40, and then obliquely upwardly and forwardly, as at 41. The tip of the bracket 42 extends up into the folded area 43 of the circular edge 22 of the fender shield 10. The tip 42 may be spot-welded or otherwise suitably secured to the rear face of the fender shield 10 if desired.

As will at once be apparent to those skilled in the art, the bracket, strut or stay 35 greatly reinforces the fender shield 10 and enables the use of relatively thin sheet metal stock.

The upper portion 40 of the bracket 35 is apertured for the reception of the latch-plate mounting bolt 44. Preferably, a tang or tab 45 is struck-out from the bracket 35 adjacent the bolt so as to extend over and bear against one of the flat faces 46 of the head of the bolt 44 to prevent the same from turning in its mounting.

The latch plate 29 is mounted on and carried by the latch plate mounting bolt 44, the shank of the bolt 44 being arranged to extend through suitable apertures in the latch plate 29 and the concealed operating lever 31, as at 47. The latch plate 29 is secured in desired position by means of a washer 48 and a nut 49, the latter being arranged to be screwed on the threaded end of the bolt 44. It is to be understood that this latch plate mounting is of such a character that either wing portion 32 or wing portion 33 may be rotated into a vertical position, as is shown in Figures 2 and 5 respectively.

The particular shape of the latch plate 29 and the manner in which it carries out its latching and disengaging functions will now be described. More particularly, the wing portion 32 of the arrow-shape latch plate 29 is shaped and arranged to provide a positive latching engagement between the fender shield 10 and the fender 11, and the wing portion 33 of the latch plate 29 is shaped and arranged to provide a member for disengaging the fender shield 10 from the fender 11.

The particular shape of wing portion 32 of latch plate 29 may best be seen in Figure 3 of the drawings. More specifically, wing portion 32 is bent obliquely rearwardly and upwardly, as at 50, so as to extend behind the underturned edge 15 of the fender 11. It is terminated in a tip portion 51, the surface of which is substantially parallel to the surface of the marginal edge portion 52 of the underturned edge 15. The tip portion 51 is preferably arranged to be disposed in slightly spaced relationship with respect to the surface 52 of the underturned edge 15 when in mounted engagement. That is to say, under normal conditions, the fingers 24, which are disposed around the peripheral edge 22 of the fender shield 10, provide the securing engagement which prevents lateral displacement of the fender shield 10 with respect to the fender 11. The wing portion 32 of the latch plate 29, however, acts to prevent accidental falling out of the fender shield 10 due to sudden jars or distortions of the fender 11 while the car or vehicle is traveling over rough surfaces. It is to be understood, however, that the tip portion 51 of the latch plate 29 may be arranged to directly abut the surface 52 of the underturned edge 15 so as to directly assist the attaching fingers 24 in retaining the fender shield 10 on the fender.

The disengaging wing portion 33 of the latch plate 29 is shaped quite differently from the latching wing portion 32, as may be seen from an inspection of Figure 6 of the drawings. More specifically, the wing portion 33 includes an intermediate portion 53 which is bent obliquely rearwardly and upwardly and then terminates in a tip portion 54 which is bent obliquely forwardly and upwardly. The tip portion 54 is spaced at such a distance from the mounting bolt 44 that when the wing portion 33 is in a vertical position, as is shown in Figure 5 of the drawings, the tip portion 54 extends above the underturned edge 15 of the fender 11. The left hand side of the tip portion 54 when viewing the construction as in Figure 5 of the drawings, is rounded over in a gradually curved surface as at 55. The curved surface 55 and the principal surface of the tip portion 54 are arranged and designed to provide a cam which will engage the underturned marginal edge 15 when the latch plate 29 is rotated in a counter-clockwise direction as viewed in Figures 2 and 5 of the drawings and to force the entire fender shield 10 downwardly and outwardly against the resilient action of the trunnion bars 20 to positively dislodge the fender shield 10 from the fender 11. Due to the fact that the upper surface of the tip portion 54 is disposed at an angle which extends rearwardly and downwardly away from the fender shield 10, it will be clear that in addition to forcing the fender shield 10 downwardly as the latch plate 29 is rotated in a counter-clockwise direction, it will also push the upper portion of the fender shield 10 outwardly away from the fender 11.

In Figure 8 I have illustrated a modified form of my invention wherein the wing portion 32 of the latch plate 29 is arranged to directly engage the surface 52 of the underturned edge 15 of the fender 11. In this form of my invention, the latching engagement provided by the tip portion 51 of the latch plate 29 directly and at all times augments the latching engagement provided by the fingers 24. The rest of the fender shield and the fender shield latching and disengaging mechanism is the same as that described in connection with Figures 1 to 7 of the drawings.

To assemble a fender shield of either of the forms hereinabove described, it is simply necessary to bring the fender shield 10 into a position opposite the opening 13 in the fender 11 and then hook the trunnion members 20 into the underturned base edges 16 of the fender 11. Then with the operating lever 31 disposed in a vertical position as is shown by the dotted lines in Figure 2, the fender shield 10 is rocked or shoved into position on the fender 11. As the fender shield 10 is rocked into position, the fingers 24 are cammed under the underturned edge 15 of the fender 11 whereupon they snap up behind the underturned edge 15 to detachably retain the fender shield on the fender 11. The person mounting the fender shield 10 on the fender 11 then reaches behind the fender shield 10, grasps the operating lever 31, and rotates it until the latching wing portion 32 of the latch plate 29 is rotated to a position such as is shown by the full lines in Figure 2. Since the wing portion 32 is designed and arranged to extend in a vertical direction when the lower end 34 of the operating lever 31 is resting on the cross bar 17, it is simply necessary for the operator to angularly move the operating lever 31 until he can snap it over the cross bar 17. Due to the fact that the lower end of the operating lever 31 is bent forwardly and then downwardly, as is shown in Figure 4, it is clear that it will be necessary to slightly pull the lower end of the operating lever outwardly in order to permit it to pass over the inturned edge 18 and the cross bar 17 at the lower edge of the fender shield 10. The operating lever 31 is preferably designed so that when it is disposed with the lower end 34 on the cross bar 17 it presses with a slight force against the rear face of the fender shield 10. This serves to firmly hold the operating lever 31 in desired position and also prevents any rattling or noise at this point.

To dislodge the fender shield 10 from the fender 11, the operator reaches behind the fender shield 10, grasps the operating lever 31 and rotates it through approximately 90°, or in other words to a position approximately 45° to the other side of the vertical. As the operating lever 31 is rotated in a counter-clockwise direction as viewed in Figures 2 and 5 of the drawings, the tip portion 54 of the latch plate 29 moves up against the underturned edge 15 and forces the fender shield downwardly and the upper edge of the fender shield outwardly. Just after the curved edge 22 of the fender shield 10 is freed from its interengaging connection with the edge 15 of fender 11 by the portion 54 of the latch plate 29, the elements of the assembly are in the position shown in Figures 5 and 6 of the drawings. As the upper edge of the fender shield 10 falls away from the fender 11, the fender shield is grasped and lifted away from the fender 11, the trunnion members 20 being disengaged at this time.

From the above description, it will be apparent that I have provided an extraordinary simple means for supporting and securing an ornamental fender skirt to a vehicle fender. It will also be apparent that I have provided an equally simple means for disengaging a fender shield mounted in this manner. Furthermore, my arrangement provides a positive latch and disengaging means which is operated by mechanisms wholly concealed during the time the fender shield is mounted on the vehicle. This provision of a concealed operating mechanism as will readily be apparent to those skilled in the art greatly enhances the appearances of the fender shield and of the vehicle as a whole.

It will also be apparent from the above description that I have provided an extremely effective fender shield construction having novel reinforcing means thereon which enables the use of relatively thin sheet metal material in forming the principal panel or body portion of the shield. The novel reinforcing means has the dual function of, first, reinforcing the fender shield and, second, of providing a convenient mounting for the latch mechanism which detachably secures the fender shield to the fender.

As the term "fender shield" is employed herein, it refers to any member which is adapted to be secured to a fender or other portion of a vehicle body for the purpose of covering the opening in the fender or vehicle body which is provided for access to or removal of a vehicle wheel. Furthermore, as the term "fender" is used and employed herein, it refers to any form of wheel fender in its broad sense, whether such fender be separate from the vehicle body part, partially separate from the vehicle body, or actually an integral part of the vehicle body, and whether or not it projects outwardly away from the principal body portion of the vehicle or not.

Although I have shown particular embodiments of my invention it will, of course, be understood that I do not wish to be limited thereto, since many modifications may be made, and I therefore contemplate by the appended claims to cover all such modifications as fall within the true spirit and scope of my invention.

I claim as my invention:

1. A fender shield comprising a sheet metal panel having an inturned base flange and a turned-back fender-engaging marginal portion, and a bracket extending upwardly from said base flange across the rear face of said panel into engagement with and under said marginal portion, said bracket being substantially rigidly secured to said base flange and to said panel in proximity to said marginal portion, whereby said panel is reinforced and stiffened by said bracket.

2. A fender shield comprising a sheet metal panel having an inturned base flange and a turned-back fender-engaging marginal portion, and a strut extending upwardly from said base flange across the rear face of said panel into engagement with said marginal portion, said strut being substantially permanently secured to said base flange and being clamped at its upper end between said marginal portion and said panel portion.

3. A fender shield comprising a sheet metal panel having an inturned base flange and a folded-back curved edge, and a sheet metal reinforcing member extending across the rear face of said panel between said inturned base flange and said curved edge, the lower end of said strut being inturned and secured to said base flange and the upper end of said strut being clamped between said folded-back curved edge and said panel.

4. A fender shield comprising a sheet metal panel having an inturned base flange and a folded-back curved edge, and a sheet metal reinforcing member extending across the rear face of said panel between said inturned base flange and said curved edge, the lower end of said strut being inturned and secured to said base flange and the upper end of said strut being clamped between said folded-back curved edge and said panel, an intermediate portion of said strut having a pressed-up longitudinally extending stiffening rib, and a second intermediate portion of said strut having movable fender-engaging latch mechanism mounted thereon and carried thereby.

5. A fender shield comprising a sheet metal panel having a lower edge and a fender engaging edge, a strut extending from said lower edge to the top of said shield and secured thereto, an intermediate portion of said strut being spaced from said shield, the under side of said intermediate portion of said strut being readily accessible, latching mechanism on said shield including an operating arm, and means for pivotally mounting said arm on said intermediate portion of said strut including a removable stud extending through said intermediate portion and having a head on the under side of said intermediate portion, and means on said strut engageable with said head for holding said stud against rotation.

ARTHUR P. FERGUESON.